United States Patent
Kozuka

(10) Patent No.: US 10,259,406 B2
(45) Date of Patent: Apr. 16, 2019

(54) SENSOR APPARATUS

(71) Applicant: JTEKT CORPORATION, Osaka-shi, Osaka (JP)

(72) Inventor: Kenichi Kozuka, Chita (JP)

(73) Assignee: JTEKT CORPORATION, Osaka-shi (JP)

( * ) Notice: Subject to any disclaimer, the term of this patent is extended or adjusted under 35 U.S.C. 154(b) by 136 days.

(21) Appl. No.: 15/464,917

(22) Filed: Mar. 21, 2017

(65) Prior Publication Data

US 2017/0282816 A1 Oct. 5, 2017

(30) Foreign Application Priority Data

Apr. 1, 2016 (JP) .................. 2016-074596

(51) Int. Cl.
| | | |
|---|---|---|
| *B60R 16/023* | (2006.01) | |
| *B62D 5/04* | (2006.01) | |
| *B60R 21/013* | (2006.01) | |
| *G05B 19/042* | (2006.01) | |
| *G08C 15/06* | (2006.01) | |
| *G01D 3/10* | (2006.01) | |

(52) U.S. Cl.
CPC ........ *B60R 16/0231* (2013.01); *B60R 21/013* (2013.01); *B62D 5/04* (2013.01); *G01D 3/10* (2013.01); *G05B 19/0423* (2013.01); *G08C 15/06* (2013.01)

(58) Field of Classification Search
CPC ..... B60R 16/0231; B60R 21/013; B62D 5/04; G01D 3/10; G05B 19/0423; G08C 15/06
See application file for complete search history.

(56) References Cited

U.S. PATENT DOCUMENTS

| | | |
|---|---|---|
| 2003/0018840 A1 | 1/2003 | Chandler et al. |
| 2012/0264316 A1 | 10/2012 | Cameron |
| 2013/0319100 A1 | 12/2013 | Kichise |

(Continued)

FOREIGN PATENT DOCUMENTS

| | | |
|---|---|---|
| JP | 2013-253806 A | 12/2013 |
| JP | 2015-228171 A | 12/2015 |

(Continued)

OTHER PUBLICATIONS

Nov. 6, 2017 Extended Search Report issued in European Patent Application No. 17162611.2.

*Primary Examiner* — Manuel L Barbee
(74) *Attorney, Agent, or Firm* — Oliff PLC

(57) ABSTRACT

A sensor apparatus includes an interface circuit to which one of a digital sensor and an analog sensor is connected as a sensor that generates an electric signal corresponding to a physical quantity of a detection target and a CPU that calculates the physical quantity of the detection target based on the electric signal generated by the sensor. The interface circuit has a first power supply circuit, a second power supply circuit, a receiver including a receiver circuit, and an operation determination circuit. The first power supply circuit generates an operating voltage of the sensor. The second power supply circuit generates a synchronizing signal for the digital signal. The receiver circuit receives an electric signal generated by the digital sensor. The operation determination circuit stops an operation at least of the second power supply circuit when the analog sensor is used.

5 Claims, 2 Drawing Sheets

(56) References Cited

U.S. PATENT DOCUMENTS

| | | |
|---|---|---|
| 2015/0100811 A1 | 4/2015 | Itou |
| 2015/0226627 A1 | 8/2015 | Kuwahara et al. |
| 2016/0193974 A1* | 7/2016 | Nishida .................... B60T 8/00 307/9.1 |

FOREIGN PATENT DOCUMENTS

| | | |
|---|---|---|
| WO | 2013/081704 A1 | 6/2013 |
| WO | 2014/064856 A1 | 5/2014 |

* cited by examiner

SENSOR APPARATUS

INCORPORATION BY REFERENCE

The disclosure of Japanese Patent Application No. 2016-074596 filed on Apr. 1, 2016 including the specification, drawings and abstract, is incorporated herein by reference in its entirety.

BACKGROUND OF THE INVENTION

1. Field of the Invention

The invention relates to a sensor apparatus.

2. Description of the Related Art

A sensor apparatus having a sensor and a control apparatus has been known as described in, for example, Japanese Patent Application Publication No. 2015-228171 (JP 2015-228171 A). The sensor detects a physical quantity that is a detection target to generate an electric signal corresponding to the detected physical quantity. The control apparatus controls a control target based on the electric signal generated by the sensor. When the sensor apparatus is mounted in a vehicle, communication between the sensor and the control apparatus complies with communication standards such as Peripheral Sensor Interface 5 (PSI5), Distributed System Interface (DSI), and Single Edge Nibble Transmission (SENT).

The communication standards including PSI5 are based on the use of a digital sensor that generates digital signals. However, an analog sensor that generates analog signals may be adopted depending on product specifications for the sensor apparatus. In this regard, a control apparatus compatible with the digital sensor and a control apparatus which is compatible with the analog sensor may be provided. However, for example, an increased number of types of control apparatuses in the sensor apparatus may lead to managerial problems with production and storage of sensor apparatuses. Thus, a sensor apparatus is desired which is compatible both with the digital sensor and with the analog sensor.

SUMMARY OF THE INVENTION

An object of the invention is to provide a sensor apparatus that is compatible both with a digital sensor and with an analog sensor.

A sensor apparatus in an aspect of the invention includes an interface circuit to which one of a digital sensor and an analog sensor is connected as a sensor that generates an electric signal corresponding to a physical quantity of a detection target and a calculation circuit that calculates the physical quantity of the detection target based on the electric signal generated by the digital sensor or the analog sensor. The interface circuit has a first power supply circuit that generates an operating voltage supplied to the digital sensor or the analog sensor, a second power supply circuit that generates a voltage allowing generation of a synchronizing signal for the digital sensor when the digital sensor is used as the sensor that generates an electric signal corresponding to a physical quantity of a detection target, a receiver circuit that receives the electric signal generated by the digital sensor when the digital sensor is used as the sensor that generates an electric signal corresponding to a physical quantity of a detection target, and an operation determination circuit that stops an operation at least of the second power supply circuit when the analog sensor is used as the sensor that generates an electric signal corresponding to a physical quantity of a detection target.

The sensor apparatus includes both an arrangement (the first power supply circuit) needed when the analog sensor is used and an arrangement (the first power supply circuit, the second power supply circuit, and the receiver circuit) needed when the digital sensor is used. Thus, the sensor apparatus is compatible both with the digital sensor and with the analog sensor. However, when the analog sensor is used, for example, noise generated from the second power supply circuit for the digital sensor may be superimposed on the operating voltage of the analog sensor which may result in a decrease in a detection accuracy of the analog sensor.

In this regard, in the above-described configuration, when the analog sensor is used, the operation at least of the second power supply circuit for the digital sensor is stopped to prevent possible noise from the second power supply circuit. Thus, the operating voltage supplied to the analog sensor is prevented from being affected by noise. Suppressing a decrease in the detection accuracy of the analog sensor caused by noise enables the analog sensor to achieve the appropriate detection accuracy. This results in suitable compatibility both with the digital sensor and with the analog sensor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
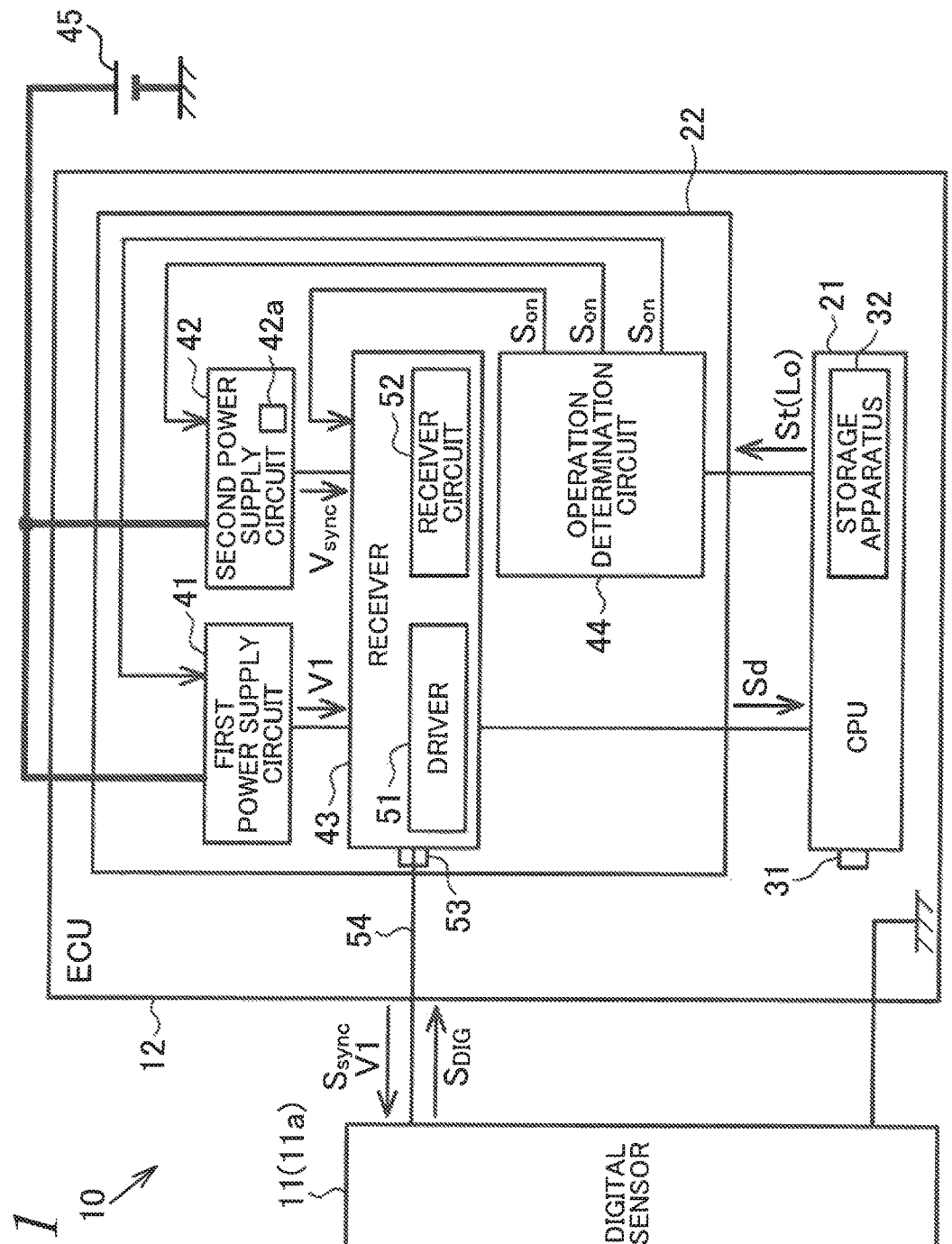
FIG. 1 is a block diagram illustrating a state of a sensor apparatus in a case where a digital sensor is adopted according to an embodiment of the invention.

An embodiment in which the sensor apparatus in the present invention is embodied will be described below. The sensor apparatus is mounted, for example, in a vehicle. As depicted in FIG. 1, a sensor apparatus 10 has a sensor 11 and an electronic control unit (ECU) 12.

One of a digital sensor 11a and an analog sensor 11b is adopted as the sensor 11 depending on specifications for the sensor apparatus 10 or the like. The digital sensor 11a detects a physical quantity of a detection target to generate a digital signal as an electric signal corresponding to the detected physical quantity. The analog sensor 11b detects the physical quantity of the detection target to generate an analog signal as an electric signal corresponding to the detected physical quantity. FIG. 1 depicts the sensor apparatus 10 in a case where the digital sensor 11a is used as the sensor 11.

The ECU 12 is used regardless of which of the digital sensor 11a and the analog sensor 11b is adopted as the sensor 11. The ECU 12 controls a control target based on the electric signal generated by the sensor 11. The ECU 12 has a central processing unit (CPU) 21 and an interface circuit 22.

The CPU 21 functions as a calculation circuit that calculates the physical quantity of the detection target of the sensor 11 based on the electric signal generated by the sensor 11. The CPU 21 also functions as a control circuit that controls the control target based on the electric signal generated by the sensor 11. The CPU 21 is provided with an analog terminal 31. When the analog sensor 11b is used as the sensor 11, the analog sensor 11b is connected to the analog terminal 31. When the digital sensor 11a is used as the sensor 11, the analog terminal 31 is not used. The CPU 21 has a storage apparatus 32. The storage apparatus 32 stores type information indicating whether the digital sensor 11a or the analog sensor 11b is used as the sensor 11. The CPU 21 generates a high level signal or a low level signal as a type signal St based on the type information stored in the storage apparatus 32. As the type signal St, the CPU 21 generates the low level signal when the type information is indicative of the digital sensor 11a, and generates the high level signal when the type information is indicative of the analog sensor 11b.

The interface circuit 22 supplies an operating voltage to the sensor 11. The interface circuit 22 operates in this manner regardless of which of the digital sensor 11a and the analog sensor 11b is used as the sensor 11. When the digital sensor 11a is used as the sensor 11, the interface circuit 22 loads a digital signal that is an electric signal generated by the digital sensor 11a. Peripheral Sensor Interface 5 (PSI5) is adopted as standards for communication between the interface circuit 22 and the digital sensor 11a. Operation modes for PSI5 include an asynchronous mode and a synchronous mode. The present example assumes the synchronous mode.

The interface circuit 22 includes a plurality of electronic circuits integrated into a single IC chip as an application specific integrated circuit (ASIC). The interface circuit 22 has a first power supply circuit 41, a second power supply circuit 42, a receiver 43, and an operation determination circuit 44.

The first power supply circuit 41 is connected to a DC power supply 45 such as a battery. The first power supply circuit 41 converts a voltage of the DC power supply 45 into a voltage suitable for the sensor 11. For example, an operating voltage suitable for the digital sensor 11a may be different from an operating voltage suitable for the analog sensor 11b. In this case, depending on the type of the sensor 11 used, the first power supply circuit 41 switches the generated voltage between the voltage suitable for the digital sensor 11a and the voltage suitable for the analog sensor 11b. However, the operating voltage suitable for the digital sensor 11a may be the same as the operating voltage suitable for the analog sensor 11b. In this case, the first power supply circuit 41 does not switch the generated voltage.

The second power supply circuit 42 is also connected to the DC power supply 45. The second power supply circuit 42 has a charge pump that boosts the voltage of the DC power supply 45 or a booster circuit 42a such as a switching regulator. The second power supply circuit 42 is intended to generate a voltage synchronizing signal $S_{sync}$ for the digital sensor 11a. The voltage synchronizing signal $S_{sync}$ may have a voltage higher than both the voltage of the DC power supply 45 and the operating voltage generated by the first power supply circuit 41. The voltage synchronizing signal $S_{sync}$ is a pulse signal that triggers data communication between the digital sensor 11a and the interface circuit 22 when the digital sensor 11a is used as the sensor 11.

The receiver 43 has a driver 51, a receiver circuit 52, and a terminal 53. The terminal 53 is connected to the sensor 11 via a transmission line 54. When PSI5 is adopted as communication standards, the transmission line 54 is provided as a two-wire line. The driver 51 supplies the operating voltage generated by the first power supply circuit 41 to the sensor 11 via the transmission line 54 regardless of which of the digital sensor 11a and the analog sensor 11b is used as the sensor 11. The driver 51 utilizes the voltage generated by the second power supply circuit 42 to generate the voltage synchronizing signal $S_{sync}$ when the digital sensor 11a is used as the sensor 11. The driver 51 supplies the generated voltage synchronizing signal $S_{sync}$ to the digital sensor 11a such that the voltage synchronizing signal $S_{sync}$ is superimposed on the voltage signal of the transmission line 54 with set cycles. The digital sensor 11a, triggered by reception of the voltage synchronizing signal $S_{sync}$, encodes the electric signal serving as a detection result into a digital signal $S_{DIG}$, and transmits the digital signal $S_{DIG}$ to the receiver circuit 52 via the transmission line 54. The digital signal $S_{DIG}$ is transmitted to the receiver circuit 52 as a pulse signal superimposed on the voltage signal of the transmission line 54. The receiver circuit 52 decodes the digital signal $S_{DIG}$ received through the transmission line 54 to generate a detection signal Sd.

When PSI5 is adopted as communication standards, Manchester coding is adopted as an encoding scheme. The operation determination circuit 44 generates an operation command $S_{on}$ or a stop command $S_{off}$ based on the type signal St generated by the CPU 21. The operation command $S_{on}$ is intended to instruct the first power supply circuit 41, the second power supply circuit 42, and the receiver 43 to operate. The stop command $S_{off}$ is intended to instruct the first power supply circuit 41, the second power supply circuit 42, and the receiver 43 to stop operating.

The operation determination circuit 44 supplies the operation command $S_{on}$ to each of the first power supply circuit 41, the second power supply circuit 42, and the receiver 43 when the type signal St indicates that the digital sensor 11a is used as the sensor 11. However, the operation command $S_{on}$ for the first power supply circuit 41 includes an instruction to generate a voltage suitable for the digital sensor 11a.

The operation determination circuit 44 supplies the operation command $S_{on}$ to the first power supply circuit 41 and supplies the stop command $S_{off}$ to each of the second power supply circuit 42 and the receiver 43, when the type signal St indicates that the analog sensor 11b is used as the sensor 11. However, the operation command $S_{on}$ for the first power supply circuit 41 includes an instruction to generate a voltage suitable for the analog sensor 11b.

Now, operations of the sensor apparatus 10 will be described which are performed when the digital sensor 11a is used as the sensor 11. The storage apparatus 32 of the CPU 21 stores the type information indicating that the digital sensor 11a is used as the sensor 11.

As depicted in FIG. 1, the CPU 21 generates a low level signal as the type signal St indicating that the digital sensor 11a is used as the sensor 11. The operation determination circuit 44 generates the operation commands $S_{on}$ for the first power supply circuit 41, the second power supply circuit 42, and the receiver 43 based on the type signal St. The first power supply circuit 41, the second power supply circuit 42, and the receiver 43 each operate upon receiving the operation command $S_{on}$. The first power supply circuit 41 generates an operating voltage V1 suitable for the digital sensor 11a. The second power supply circuit 42 generates a voltage $V_{sync}$ for the voltage synchronizing signal $S_{sync}$ through the booster circuit 42a.

The driver 51 supplies the operating voltage V1 generated by the first power supply circuit 41 to the digital sensor 11a via the transmission line 54. The digital sensor 11a operates by receiving the supply of the operating voltage V1. The driver 51 uses the voltage $V_{sync}$ generated by the second power supply circuit 42 to generate the voltage synchronizing signal $S_{sync}$ with set cycles, and supplies the generated voltage synchronizing signal $S_{sync}$ to the digital sensor 11a via the transmission line 54. Each time the digital sensor 11a receives the voltage synchronizing signal $S_{sync}$, the digital sensor 11a supplies the digital signal $S_{DIG}$ serving as a detection result to the receiver 43 via the transmission line 54. The receiver circuit 52 generates the detection signal Sd based on the digital signal $S_{DIG}$ serving as a detection result and supplied via the transmission line 54, and supplies the generated detection signal Sd to the CPU 21. The CPU 21 calculates the physical quantity of the detection target of the digital sensor 11a based on the detection signal Sd supplied by the receiver circuit 52 to control the control target based on the calculated physical quantity.

Now, operations of the sensor apparatus 10 will be described which are performed when the analog sensor 11b is used as the sensor 11. The storage apparatus 32 of the CPU 21 stores the type information indicating that the analog sensor 11b is used as the sensor 11.

Figure 2:
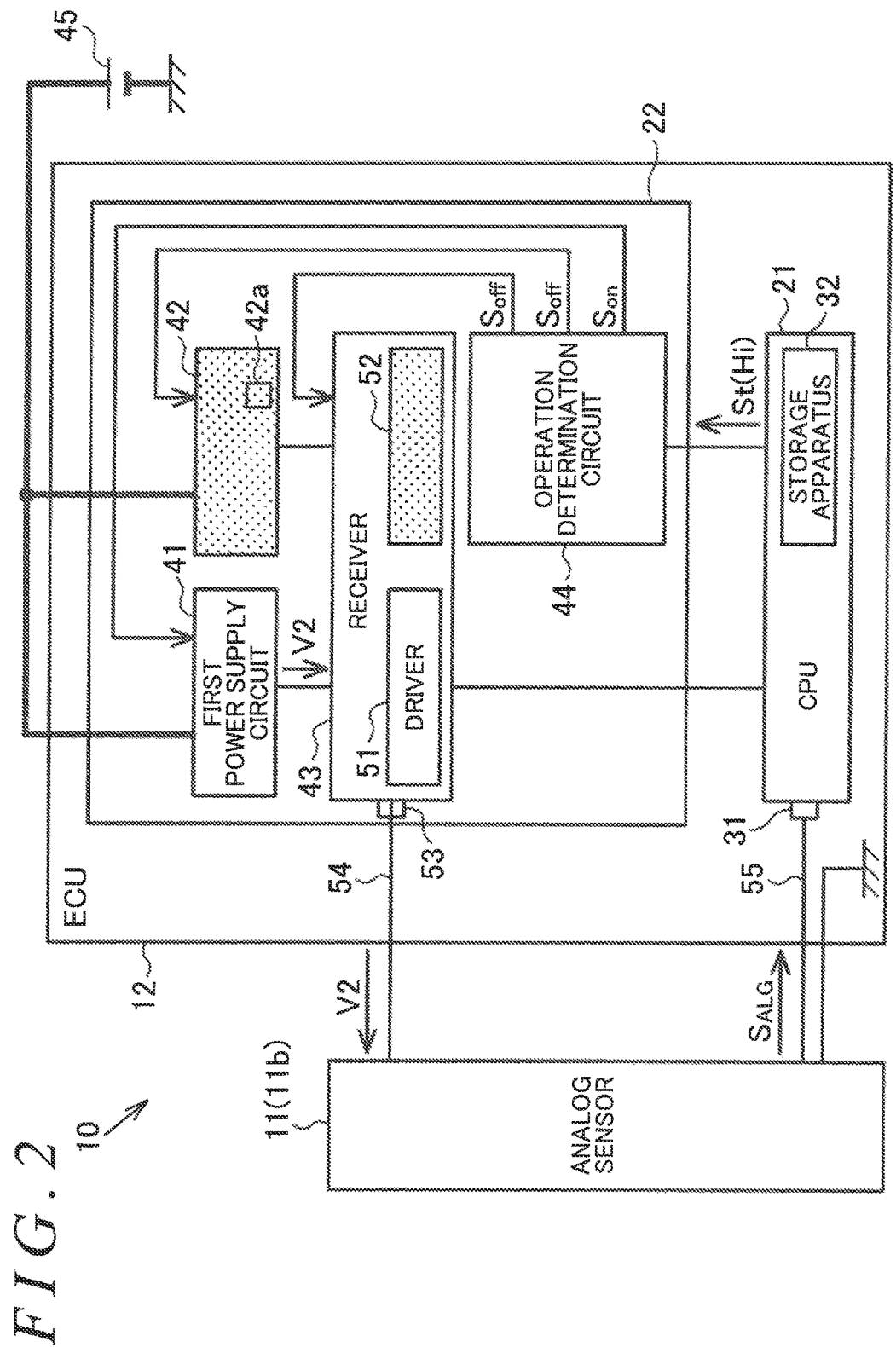
FIG. 2 is a block diagram illustrating the state of the sensor apparatus in a case where an analog sensor is adopted according to the embodiment of the invention.

As depicted in FIG. 2, an analog output terminal (not depicted in the drawings) of the analog sensor 11b is connected to the analog terminal 31 via a transmission line 55. The CPU 21 generates a high level signal as the type signal St indicating that the analog sensor 11b is used as the sensor 11. The operation determination circuit 44 generates the operation command $S_{on}$ for the first power supply circuit 41 based on the type signal St. The operation determination circuit 44 generates the stop command $S_{off}$ for the second power supply circuit 42 and the receiver 43 based on the type signal St.

The first power supply circuit 41 operates upon receiving the operation command $S_{on}$, and generates an operating voltage V2 suitable for the analog sensor 11b. The second power supply circuit 42 stops operating upon receiving the stop command $S_{off}$. The receiver 43 stops the operation of the receiver circuit 52 upon receiving the stop command $S_{off}$. The driver 51 supplies the operating voltage V2 generated by the first power supply circuit 41 to the sensor 11 via the transmission line 55. The analog sensor 11b operates by receiving the supply of the operating voltage V2, and generates a detection signal $S_{ALG}$ that is an analog signal corresponding to the physical quantity of the detection target. The CPU 21 calculates the physical quantity of the detection target of the analog sensor 11b based on the detection signal $S_{ALG}$ delivered from the analog sensor 11b via the transmission line 55, and controls the control target based on the calculated physical quantity.

In FIG. 2, a block representing the second power supply circuit 42 and a block representing the receiver circuit 52 are hatched with a uniform dot pattern to indicate that the second power supply circuit 42 and the receiver circuit 52 are stopped.

When the analog sensor 11b is used as the sensor 11, the second power supply circuit 42 and the receiver circuit 52 are stopped. The reason is as follows.

In the case where the analog sensor 11b is used as the sensor 11, if the operations of the second power supply circuit 42 and the receiver circuit 52 are not stopped, noise resulting from the operations of the second power supply circuit 42 and the receiver circuit 52 may affect the operating voltage V2 generated by the first power supply circuit 41. In particular, the operating voltage V2 may be affected by noise generated resulting from an operation of the booster circuit 42a of the second power supply circuit 42. Another factor that makes the operating voltage V2 likely to be affected by noise is the configuration in which the electronic circuits (41 to 44) included in the interface circuit 22 are integrated into an ASIC in one chip in order to downsize the ECU 12. That is, the distance is reduced between the first power supply circuit 41 and the second power supply circuit 42, which may cause generation of noise.

A possible adverse effect of noise is that, for example, noise generated from the second power supply circuit 42 or slight noise generated from the receiver circuit 52 is superimposed on the operating voltage V2 generated by the first power supply circuit 41 to fluctuate the operating voltage V2. Fluctuation of the operating voltage V2 also affects the digital signal $S_{DIG}$ serving as a detection result from the analog sensor 11b, possibly reducing detection accuracy of the analog sensor 11b.

Thus, when the analog sensor 11b is used as the sensor 11, the second power supply circuit 42 and the receiver circuit 52 dedicated to the digital sensor are preferably stopped, as in the present example. This inhibits generation of noise from the second power supply circuit 42 and the receiver circuit 52, preventing superimposition of noise on the operating voltage V2 generated by the first power supply circuit 41. Thus, a decrease in the detection accuracy of the analog sensor 11b is suppressed, enabling the analog sensor 11b to achieve the appropriate detection accuracy. When the digital sensor 11a is used, the sensor apparatus 10 is prevented from suffering such a noise problem as occurs when the analog sensor 11b is used. This is because the digital sensor 11a (digital signal) is less likely to be affected by noise than the analog sensor 11b (analog noise).

Therefore, one ECU 12 can be suitably used regardless of which of the digital sensor 11a and the analog sensor 11b is used as the sensor 11. That is, even when configured to include an arrangement needed when the digital sensor 11a is used and an arrangement needed when the analog sensor 11b is used, the ECU 12 (interface circuit 22) is suitably compatible both with the digital sensor 11a and with the analog sensor 11b. The arrangement needed when the digital sensor 11a is used includes the first power supply circuit 41, the second power supply circuit 42, the driver 51, and the receiver circuit 52. The arrangement needed when the analog sensor 11b is used includes the first power supply circuit 41 and the driver 51.

The present embodiment may be varied as follows.

As the type signal St, the CPU 21 may generate the high level signal when the type information stored in the storage apparatus 32 is indicative of the digital sensor 11a, and generate the low level signal when the type information stored in the storage apparatus 32 is indicative of the analog sensor 11b. Even in this case, the type of the sensor 11 used can be determined based on the type signal St.

In the present embodiment, the CPU 21 generates the high level signal or the low level signal as the type signal St based on the type information on the sensor 11 stored in the storage apparatus 32. However, the CPU 21 may generate the type signal St including the type of the sensor 11 as data. Even in this case, the type of the sensor 11 used can be determined based on the type signal St.

The CPU 21 may be provided with an external input terminal to which an external input apparatus is connected. The external input apparatus is connected to the external input terminal of the CPU 21 to enable writing of information to the storage apparatus 32 through the external input apparatus and rewriting of the information in the storage apparatus 32.

In the present example, the CPU 21 functions as a control circuit that controls the control target based on the electric signal generated by the sensor 11. However, the function of the CPU 21 serving as the control circuit may be omitted. That is, the CPU 21 may simply function as a calculation circuit that calculates the physical quantity of the detection target of the sensor 11 based on the electric signal generated by the sensor 11. The ECU 12 is provided with another CPU or a microcomputer that functions as a control circuit that controls the control target. The other CPU or microcomputer that functions as a control circuit controls the control target based on the physical quantity calculated by the CPU 21 serving as the calculation circuit.

The configuration of the ECU 12 as a whole need not be the same for the case where the digital sensor 11a is used and for the case where the analog sensor 11b is used. At least the interface circuit 22 configured as an ASIC needs to be compatible both with the digital sensor 11a and the analog sensor 11b. For example, when the analog sensor 11b is used as the sensor 11, a signal path may be omitted through which the detection signal Sd is transmitted and received between the receiver 43 and the CPU 21. When the digital sensor 11a is used as the sensor 11, the CPU 21 without the analog terminal 31 may be adopted.

In the present embodiment, when the analog sensor 11b is used as the sensor 11, the second power supply circuit 42 and the receiver circuit 52 dedicated to the digital sensor are stopped. However, the second power supply circuit 42 may be exclusively stopped. Because of the booster circuit 42a provided in the second power supply circuit 42, the second power supply circuit 42 is the greatest source of noise among various electronic circuits forming the interface circuit 22. Therefore, simply stopping the second power supply circuit 42 enables a significant reduction in the adverse effect of noise on the operating voltage V2 generated by the first power supply circuit 41.

The sensor apparatus 10 is applicable to various technical fields. The sensor apparatus 10 may be mounted, for example, in a vehicle such as an automobile. In this case, the control target of the ECU 12 may be any of various in-vehicle systems such as an electric power steering system and an airbag system. When the control target of the ECU 12 is an electric power steering system, the sensor 11 may be a torque sensor that detects a steering torque applied to a steering wheel. When the control target of the ECU 12 is an airbag system, the sensor 11 may be a collision sensor that detects a collision of the vehicle.

What is claimed is:

1. A sensor apparatus comprising:
an interface circuit to which one of a digital sensor and an analog sensor is connected as a sensor that generates an electric signal corresponding to a physical quantity of a detection target; and
a calculation circuit that calculates the physical quantity of the detection target based on the electric signal generated by the digital sensor or the analog sensor, wherein
the interface circuit has:
a first power supply circuit that generates an operating voltage supplied to the digital sensor or the analog sensor;
a second power supply circuit that generates a voltage allowing generation of a synchronizing signal for the digital sensor when the digital sensor is used as the sensor that generates an electric signal corresponding to a physical quantity of a detection target;
a receiver circuit that receives the electric signal generated by the digital sensor when the digital sensor is used as the sensor that generates an electric signal corresponding to a physical quantity of a detection target; and
an operation determination circuit that stops an operation at least of the second power supply circuit when the analog sensor is used as the sensor that generates an electric signal corresponding to a physical quantity of a detection target.

2. The sensor apparatus according to claim 1, wherein the operation determination circuit also stops an operation of the receiver circuit when the analog sensor is used as the sensor that generates an electric signal corresponding to a physical quantity of a detection target.

3. The sensor apparatus according to claim 1, wherein the calculation circuit has a storage apparatus that stores type information indicating which of the digital sensor and the analog sensor is used as the sensor that generates an electric signal corresponding to a physical quantity of a detection target, and
the operation determination circuit determines, based on the type information, which of the digital sensor and the analog sensor is used as the sensor that generates an electric signal corresponding to a physical quantity of a detection target.

4. The sensor apparatus according to claim 1, wherein the interface circuit is integrated into a single IC chip.

5. The sensor apparatus according to claim 1, wherein when the digital sensor is used as the sensor that generates an electric signal corresponding to a physical quantity of a detection target, Peripheral Serial Interface 5 is adopted as a communication standard for communication between the digital sensor and the interface circuit.

* * * * *